Figure 7:
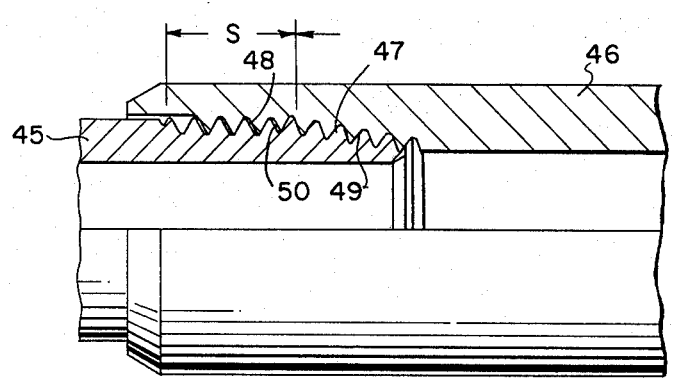

United States Patent [19]
Fredd

[11] 3,994,516
[45] Nov. 30, 1976

[54] TELESCOPING PIPE COUPLING WITH IMPROVED PRESSURE SEAL CONNECTION THREADS

[75] Inventor: John V. Fredd, Dallas, Tex.
[73] Assignee: Otis Engineering Corporation, Dallas, Tex.
[22] Filed: Mar. 5, 1975
[21] Appl. No.: 555,630

[52] U.S. Cl. .................. 285/39; 285/175; 285/333; 285/392
[51] Int. Cl.² .......................... F16L 15/00
[58] Field of Search ......... 285/39, 175, 357, 392, 285/393, 333, 334, 355, 251, 390, 4, 3; 151/14 R

[56] References Cited
UNITED STATES PATENTS

| | | | |
|---|---|---|---|
| 278,230 | 5/1883 | Fairlamb | 151/14 R |
| 720,578 | 2/1903 | Greenfield | 285/175 |
| 1,064,546 | 6/1913 | Ryan | 151/14 R |
| 1,973,848 | 9/1934 | Duffy | 285/333 X |
| 2,029,846 | 2/1936 | Von Henke | 285/251 |
| 2,288,684 | 7/1942 | Couty | 285/251 |
| 2,329,198 | 9/1943 | Hattan et al. | 285/251 |
| 3,212,547 | 10/1965 | McKay et al. | 151/14 R |
| 3,778,089 | 12/1973 | Fredd et al. | 285/39 |

Primary Examiner—Thomas F. Callaghan
Attorney, Agent, or Firm—Warren H. Kintzinger

[57] ABSTRACT

A threaded interconnect structure incorporating respective matching internal and external threaded portions of members to be threadedly interconnected, with the thread geometry defining a profile having contiguous straight-thread and tapered-thread sections. Sealing integrity and make-up length and sealing predictability of the threaded interconnection are improved over standard tapered-thread joints. Tapered sections have a taper in excess of standard taper-threaded profiles and comprise comparatively fewer threads, with the sealing action in the tapered section being mechanically aided by the straight-thread sections during make-up of the joint, and thereafter mechanically reinforced by the straight-thread sections. A tool chaser of new and novel design permits cutting straight-tapered profile transitions with maintenance of pitch and thread matching.

9 Claims, 12 Drawing Figures

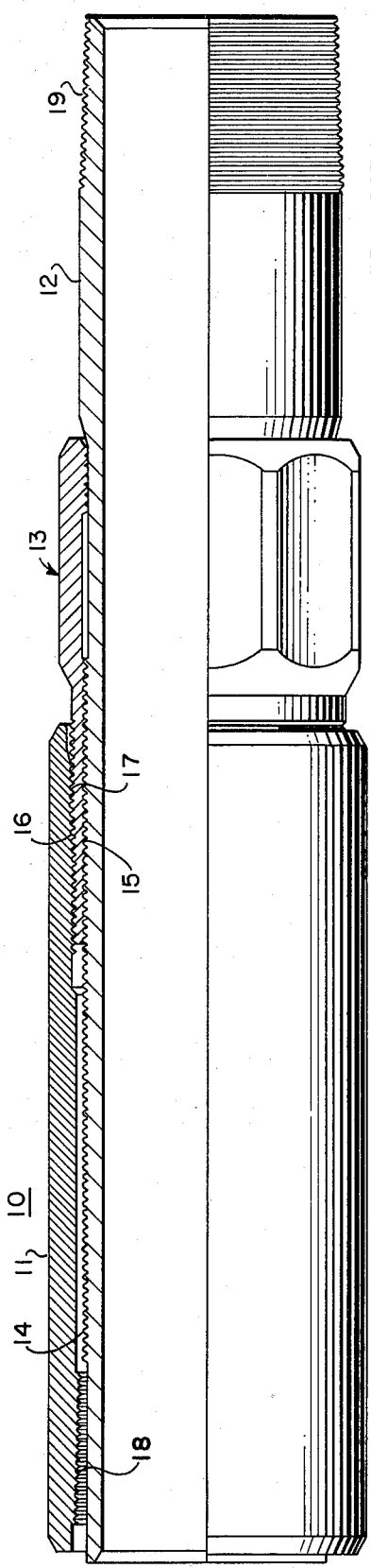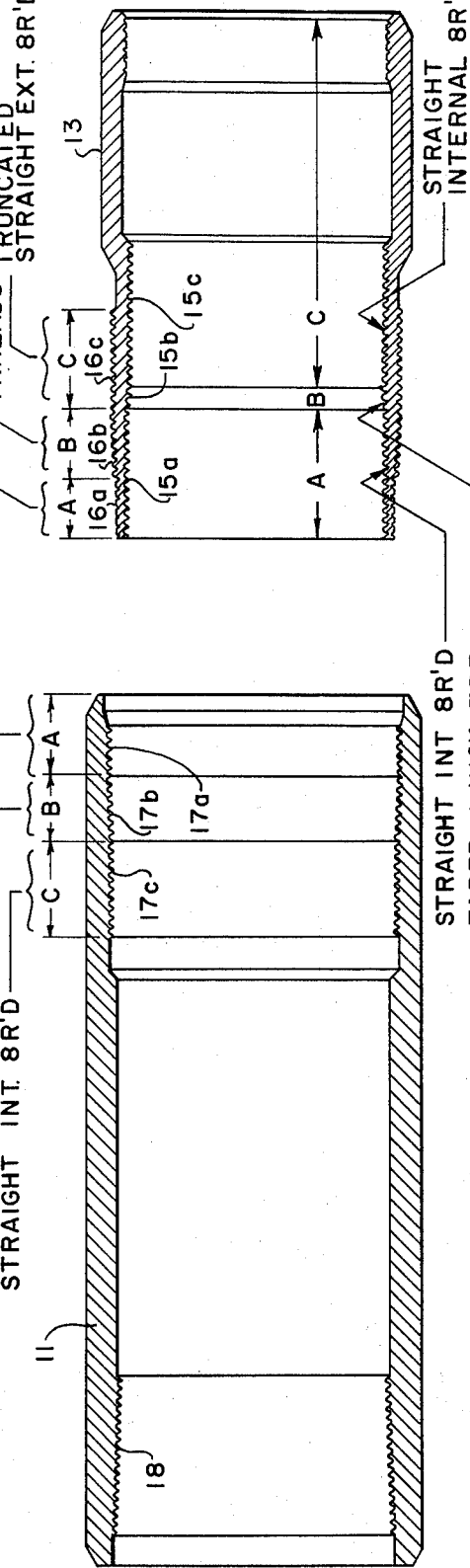

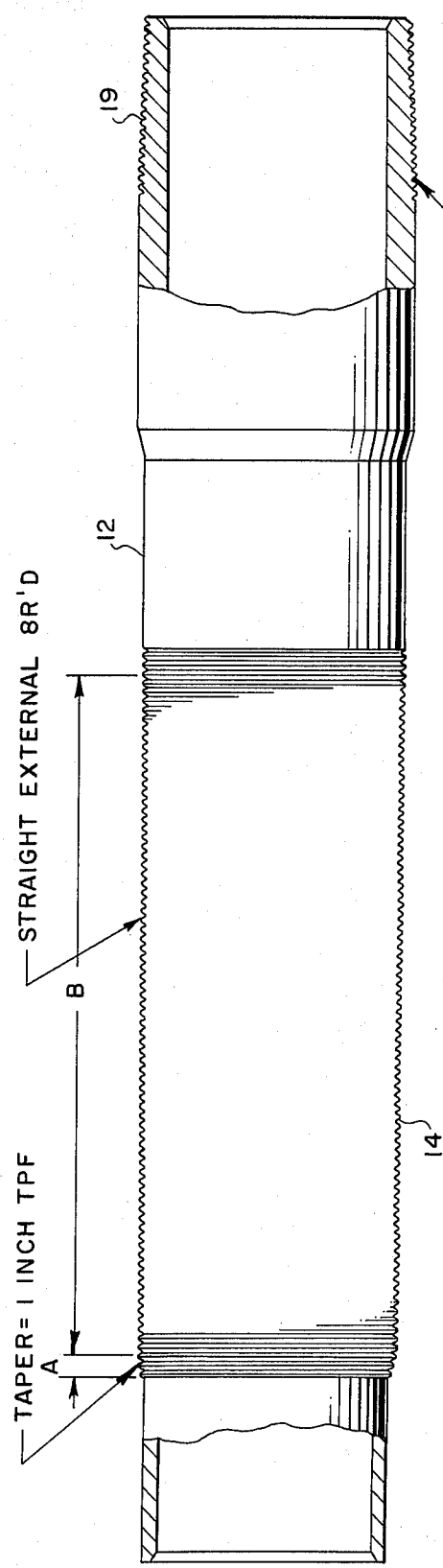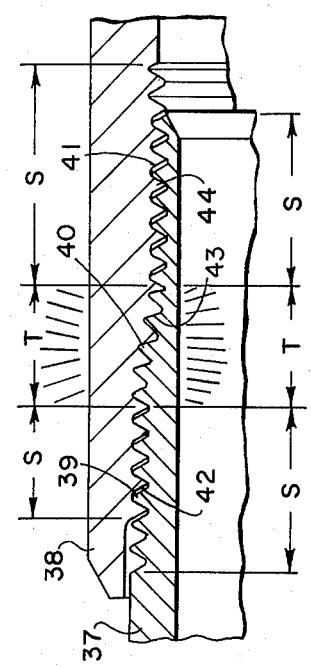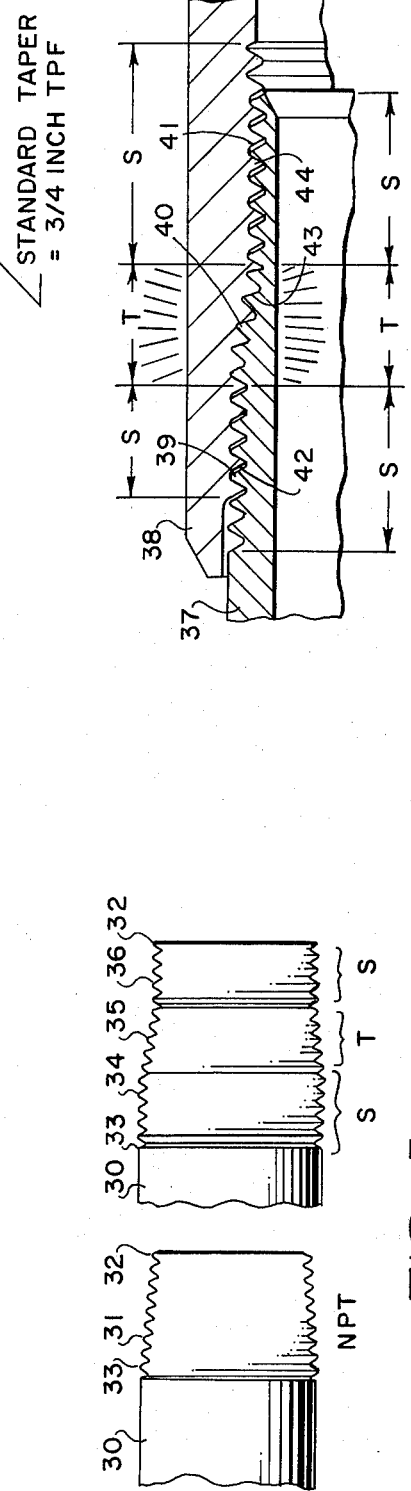

(PRIOR ART TOOL)

TELESCOPING PIPE COUPLING WITH IMPROVED PRESSURE SEAL CONNECTION THREADS

This invention relates in general to pipe couplings and, in particular, to a new and novel coupling structure employing pressure sealing connection threads of a new and improved thread design.

In my U.S. Pat. No. 3,778,089, assigned to the assignee of the present invention, there is described a new and improved telescopical pipe coupling for joining threaded members, that provides, in accordance with its stated objectives, a pipe extension joint assembly that is adjustable in length without affecting the fluid-tight integrity of the threaded connections. The pipe coupling described in U.S. Pat. No. 3,778,089 includes a leakproof, straight-threaded connection permitting longitudinal adjustment of the coupling with maintenance of pressure seal, and that does not require gaskets for sealing against leakage. These objectives are attained by a coupling that has first and second, mutually telescoping pipe members interconnected by a gland that is threaded both internally and externally. One of the gland threads, and a pipe member thread with which it engages, are formed with matching tapered threads, such that a wedging action between the gland and pipes is realized when the gland is tightened. This wedging action squeezes the gland, radially, to aid in effecting a seal along the mating straight threads of the gland and mating straight threads of one of the pipes. Prior to final tightening to effect the seal, one of the pipes is rotatable, with respect to the gland, along the respective mating straight-threaded interconnection, thus permitting adjustment of the make-up length of the coupling between the sections and/or changes in the relative positions of alignment of the connected pipe sections with pressure seal integrity maintained. The coupling thus utilizes the wedging action of a matching, tapered gland and pipe thread connection to force straight threads on an opposing gland wall to pressure-seal against engaged ones of matching straight threads, and the telescoping coupling maintains inside and outside pressure seal as concerns the interconnecting gland, while permitting that pipe member, in straight-threaded engagement with the gland, to rotate, with respect to the gland, and yet maintain pressure seal.

The use of threaded interconnections between pipes has long employed standard tapered threaded interconnect to provide a pressure sealing feature. Standard tapered threaded interconnections might employ, for example, fifteen or more tapered threads of standard three-fourths-inch-per-foot taper, and these threaded interconnections are known to seal by metal-to-metal compressive stress in the made-up interconnection. The sealing competence is directly related to this compressive stress, and while increased tapers would increase the stress, the overall stress might become destructive under conditions wherein a standard make-up torque is applied in joint make-up employing a considerable number of tapered threads in the interconnection.

In applications of standard tapered threads in the pipe coupling structure defined in the above-referenced patent, an exacting control of make-up torque is paramount to the utilitarian features provided by the joint. Further, predictable make-up lengths in such a coupling is of considerable importance when such couplings are made up in down-hole locations in wells and the make-up length predictability of the pipe coupling of U.S. Pat. No. 3,778,089 may not be sufficient for efficient installation when standard tapered threads are employed in the gland to attain the wedging action by which sealing is realized.

Still further, threaded interconnections employing standard tapered threads may lack the mechanical competence necessary for usage in certain environments.

It is, therefore, a principal object of this invention to provide a pipe coupling structure employing the wedging and sealing action of tapered thread interconnects with a marked improvment in pressure sealing competence.

A further object for such a pipe coupling structure is the provision of an improved threaded interconnection between pipe members that exhibits a marked increase in mechanical competence as compared to standard tapered, threaded interconnections.

Another object is the provision, for such a pipe coupling structure, of an improved threaded interconnection means that exhibits a greater mechanical security, and that is less likely to leak or swivel off, if jarred, than shoulder-to-shoulder, straight-threaded joints.

Another object of the invention is the provision, in a telescoping pipe coupling structure, as well as in threaded interconnections per se, an improved thread design with a more predictable make-up length, by requiring less rotation between "hand-tight" and "full" torque requirements for joint makeup.

A still further object of the invention is the provision of a new and novel thread design useful in making pressure-sealed threaded interconnections.

A further object of the invention is the provision of a new thread design, and thread chaser for cutting same to the form of both internal and external threads.

Features of the invention useful in accomplishing the above objects include, in a telescopical pressure-sealed pipe coupling, as well as in a threaded interconnection, per se, a threaded interconnect structure incorporating respective matching, internal and external threaded portions of members to be threadedly interconnected, with these portions having a thread design herein defined as straight — tapered — straight (STS), wherein the threading comprises a first plurality of threads having standard straight-thread diameter, and a second axially displaced plurality of threads having a different standard straight thread diameter, with the first and second straight threaded portions being separated by a middle plurality of threads having a linear taper so as to form a contiguous thread-run from one straight-thread diameter to the other, with the same pitch being maintained throughout. The thread is thus axially divided into three sections: two straight-thread portions, joined by an intermediate tapered thread portion. The tapered thread middle portion may be formed of comparatively few threads, having a taper greater than that of standard tapered threads.

As incorporated in the improved telescopical pressure-sealed pipe coupling structure herein described, the improved thread enhances mechanical rigidity and affords a higher pressure seal at more predicatable make-up torque. Also, improved make-up length predictability is realized by employing the straight-threaded projections to radially and axially reinforce the tapered sections, while the tapered sections, in being of a greater taper than normal tapered threads, employ comparatively fewer threads, with attendent metal-to-metal compressive stress increase therebetween to increase joint sealing competence. The STS thread may be cut by a thread chaser of simple and economical double-point design, as herein described, to maintain pitch continuity and proper mating throughout the STS thread run.

Specific embodiments representing what are presently regarded as the best mode of carrying out the invention are illustrated in the accompanying drawing.

Figure 8:
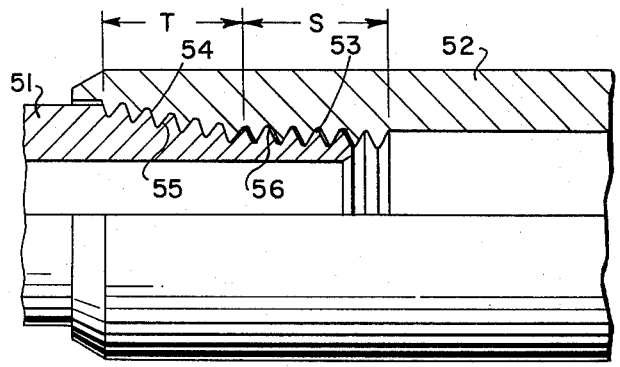
Figure 9:
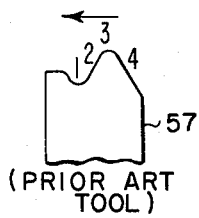
Figure 10:
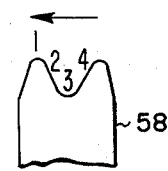
Figure 11:
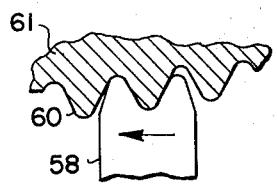
Figure 12:
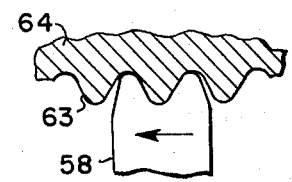

In the drawing:

FIG. 1 represents a partially cut away and sectioned longitudinal view, of a telescopical pipe coupling incorporating the new thread design of the invention;

FIG. 2, a cut away and sectioned view of a first, outer tubular member employed in the coupling of FIG. 1;

FIG. 3, a cut away and sectioned view of the interconnecting and sealing gland member employed in the coupling of FIG. 1;

FIG. 4, a side elevation and sectioned view of a second, and inner tubular, member employed in the coupling of FIG. 1;

FIG. 5, a diagramatic representation of comparative standard tapered pipe thread, and the improved standard — tapered — standard thread of the invention;

FIG. 6, a diagramatic representation of the sealing and drive competence features of the improved standard-tapered-standard thread of the invention, as employed in a pipe joint interconnect;

FIG. 7, a diagramatic representation of a further threaded interconnect employing a straight-tapered internal thread and matching external thread;

FIG. 8, a diagramatic representation of a still further pressure sealing threaded interconnected employing a tapered-straight thread profile sequence for the internal thread and matching external thread;

FIG. 9, an illustration of the cutting profile of a standard taper-thread chaser tool;

FIG. 10, an illustration of the cutting profile of a new thread chaser tool useful in cutting both the straight and tapered thread profiles defining the straight-tapered-straight thread described herein;

FIG. 11, a diagramatic illustration of the chaser of FIG. 10, as employed in cutting a tapered thread profile; and FIG. 12, a diagramatic illustration of the chaser of FIG. 10, as employed in cutting a straight thread profile.

Referring to the drawing:

The improved telescopical pipe coupling 10 of FIG. 1 comprises an outer pipe section 11 and an inner pipe section 12, coupled together by means of a gland member 13. The inner pipe section 12 is formed with straight external threads 14 that engage with internal threads 15 of gland member 13. The gland 13 is formed with external threads 16 which engage internal threads 17 of the outer pipe section 11.

As described in the above-referenced U.S. Pat. No. 3,778,089, the teachings of which are incorporated herein be reference, the threaded interconnection between gland member 13 and outer pipe section 11 may comprise a matching standard taper threaded interconnection between threads 16 and 17, such that, upon gland 13 being torqued into threaded engagement with outer pipe section 11, the resulting wedging action of the tapered thread interconnection therebetween affects an outer pressure seal between gland 13 and outer pipe section 10 in the known fashion of tapered thread interconnections, while an internal pressure seal is affected by the gland 13 being compressed radially inwardly to load the internal threads 15 of the gland 13 into the external threads 14 of the inner pipe section 12. This internal pressure seal can be maintained, while permitting rotation of the inner pipe section 12 with respect to gland 13, thus permitting the coupling assembly 10 to be adjustable in length; for example, extended in length from the foreshortened limit depicted in FIG. 1. As in the coupling described and claimed in U.S. Pat. No. 3,778,089, the outer pipe section may be formed with a standard-taper internal thread 18, and the inner pipe section 19 formed with a standard-taper external thread 19 to facilitate interconnect of the coupling assembly 10 between, for example, the respective ends of spaced pipes respectively threaded to match the interconnect threads 18 and 19 of the coupling assembly.

In accordance with the present invention, at least the external threads 16 of gland 13 are formed with a new overall thread profile that differs from a standard taper thread by being formed with the straight-tapered-straight (STS) thread described herein, with the pitch diameter geometry of the internal threads 17 of the outer pipe section 12 matching the external thread geometry of the gland 13. As will be further described, an initial interference fit of the threaded connection between gland 13 and inner pipe section 12 might be desired to enhance inner seal between these members whereupon the internal thread 15 of gland 13 might additionally be formed with an STS thread geometry.

FIGS. 2 and 3 depict the STS thread geometry which defines the thread geometry of the matching threads 15 and 17 of gland 13 and outer pipe section 11, respectively.

Referring to FIG. 3, the external thread profile of gland 13 is defined by a run of straight threads 16a extended for a length A, followed by an intermediate run of tapered threads 16b that extend for a length B, and terminate in a second run of straight threads 16c over a length C. The diameter of straight threads 16c exceeds that of straight threads 16a, with the taper of tapered threads 16b exceeding that of the standard ¾ inch taper per foot and maintaining a continuity of pitch throughout the straight and tapered thread runs. For example, the taper of the external gland threads 16b might be a 1 inch or a 1-¼ inch taper per foot so as to be in excess of the standard ASA taper of ¾ inch per foot, with the straight thread runs of threads 16a and 16c being appropriately diametered to maintain match and pitch continuity throughout the STS thread run.

As depicted in FIG. 2, the internal threads 17 of the outer pipe section are cut in STS profile to match the geometry of the external threads 16 of gland 13, with which they engage, to form the coupling outer seal provided by gland 13. Thus, the thread profile of threads 17 is formed as an initial run of straight threads 17a over a length A that match the external straight threads 16c of gland 13. An intermediate run of internal tapered threads 17b match the intermediate tapered threads 16b of gland 13. The internal thread run 17 of outer pipe member 11 is then terminated in a straight thread run of threads 17c that match the terminal external straight threads 16a gland 13.

Referring again to FIG. 3, both the A and C external threads are truncated threads to avoid crest interference in the internal threads 17 of outer pipe section 11.

With gland 13 threaded into outer pipe member 11, as depicted in the sealed make-up relationship of FIG. 1, an outer seal is effected, due to compressive stress between external tapered threads 16b of gland 13 and internal tapered threads 17b of outer pipe section 11, and with these tapered thread sections having a taper greater than standard, comparatively fewer tapered threads may be employed to affect the pressure seal than in standard tapered thread joints, while the make-up torque and length predictabilities of the resulting joint is materially improved.

As above discussed, the inner seal of the coupling assembly (between gland and inner pipe section 12) is realized by the radically inward squeezing of the gland 13 as it is threaded into outer pipe section 11. This squeezing action loads the internal threads 15 of gland 13 against the external threads 14 of the inner pipe section 12. As depicted in the pipe coupling embodiment of FIGS. 1–4, the internal threads 15 of gland 13 may be formed with a straight-tapered-straight profile for the purpose of establishing a slight interference fit on the inner pipe section 12, if desired. For this purpose, as shown in FIG. 3, the internal thread profile of gland 13 might comprise respective contiguous runs of straight threads 15a in region A, an expanded taper comprising a pair of threads 15b in region B having a taper in excess of standard, followed by straight threads 15c in region C. The respective straight thread diameters of threads 15a and 15c may then be selected for a slight interference fit with external straight threads 14 on inner pipe section 12, followed by a small clearance fit of gland internal threads 15c with inner pipe section threads 14 in internal thread region C of gland 13. With this internal STS thread profile as concerns gland 13, the first two threads on the inner pipe section 12 (region A, FIG. 4) would also be tapered to match the two-thread taper of internal thread geometry at region B in the gland 13 to minimize the danger of galling at initial assembly.

It should be noted, however, that the internal thread geometry of gland 13 might employ a continuous straight-thread geometry, rather than the above-described STS geometry, and still permit the make-up, sealing, and mechanical integrity improvements as realized in accordance with the objectives of the invention.

The primary objectives of a telescoping pipe coupling having improved mechanical competence, along with pressure-sealing competence and improved predictability as concerns make-up torque and make-up length, are realized by employing the new STS thread geometry in the gland and outer pipe section threaded interconnection that forms the outer seal and compresses the gland against the inner pipe section to form the inner seal. The key to realization of the improvements in the telescopical pipe coupling structure described herein, is the use of the straight-tapered-straight thread geometry to define the thread profile between at least one pipe and gland threaded interconnection, and by means of which the threaded interconnection between the gland and the other of the pipes is loaded, radically, to effect a pressure seal.

The improvements in sealing integrity, make-up torque predictability, mechanical competence, and make-up length predictability of the improved pipe coupling structure herein described are thus realized by the incorporation of the new and novel threaded interconnect geometry defined by contiguous runs of tapered and straight threads, further details of which will now be considered.

Referring to FIG. 5, the basics of the known standard tapered thread and the new straight-tapered-straight thread geometry are diagramatically depicted. A tubular member 30 is shown with external standard tapered threads 31, having an expanding standard taper of ¾ inch per foot, running from minimum diameter end thread 32, and increasing to maximum diameter thread 33. The number of threads in a standard tapered thread run for pipe joints might be fifteen or more. If the standard tapered thread 31 of FIG. 5 is axially divided into three sections, the taper of the middle section increased from standard, and the taper of the end sections eliminated, the thread profile can be described as being straight-tapered-straight (STS). FIG. 5 illustrates an STS external thread formed on a tubular member 30 wherein the first section of threads 36 are straight threads having the diameter of end thread 32, the middle section of threads 35 is formed with a taper greater than that of standard taper, and the last section of threads 34 are straight threads having the diameter of the terminal thread 33.

Now, by limiting the number of tapered threads 35 to from three-to-five-rather than the normal fifteen or more that comprise a standard taper thread run, the metal-to-metal compressive stress is increased, thereby increasing joint sealing competence. The increased taper (as compared to standard taper) of the tapered threads 35 prevents the compressive stress from becoming destructive when standard make-up torque is applied in making up a joint. The amount of rotation between hand-tight and full-torque, as they relate to joint make-up, is also reduced and the made-up length of a joint employing STS thread profiles is therefore more predictable than it is in joints employing standard tapered threads. The straight threads in the STS threaded joint provide mechanical back-up for the sealing tapered-thread section of the joint. If axial loading or high pressure causes the tapered threads to yield slightly, the straight threads will pick up part of the load. Also, particularly in the case of thin-walled connections, the straight thread projections will radially and axially reinforce the tapered sections and swaging of the male threads and swelling of female threads will be respective straight-thread projections, thus greatly increasing both pressure and mechanical competence of the joint in both directions.

The above features are diagramatically illustratd in the threaded joint of FIG. 6, where tubular members 37 and 38 are threadedly interconnected to form an improved pressure-sealed joint, using matching STS thread profiles for the external threads of tubular member 37 and the internal threads of tubular member 38. Matching tapered threads 40 and 43, of taper in excess of standard taper, form a tight sealing region in the manner of standard tapered interconnections because of compressive stress imparted by the make-up. The straight thread sections of the threaded interconnection, as formed from engaging ones of threads 39 and 42, and engaging one of threads 41 and 44, add mechanical rigidity to the sealed interconnection, and permit the increased taper of the tapered interconnection between threads 40 and 43, by mechanically aiding in the joint make-up. Upon joint make-up, straight threads 41 and 44 tend to pull the following tapered interconnection, while straight threads 39 and 42 tend to push the preceding tapered interconnect. Thus, both mechanical integrity and sealing integrity are improved, over a standard tapered-thread interconnection, with the straight thread portions mechanically aiding in overcoming the increased resistance of the increased taper of the center section, while, the fewer tapered threads employ, as compared to standard tapered interconnections, realizes increased metal-to-metal compressive stress, with attendant increase in pressure sealing integrity. Further, since fewer tapered threads need to be employed to realize a given pressure-seal-defining compressive stress, the overall compressive force of the tapered-thread section is lessened, and the make-up of a pressure-sealed interconnection is less liable to generate destructive compression forces.

For particular usages, the new thread profile described herein may logically be contemplated to extend to the use of threaded interconnections employing straight-tapered and tapered-straight thread profiles.

Referring to FIG. 7, a threaded joint between tubular members 45 and 46 is diagramatically illustrated. Here, the initial run of external threads 47 on tube 45 comprises a tapered-thread run of comparatively fewer threads than would a standard tapered thread, followed by a run of straight threads 48. The tubular member 46 is formed with a matching internal thread geometry defined by a run of tapered threads 49 and contiguous straight threads 50. The combination of straight and tapered threads employed in the joint of FIG. 7 enjoys the advantages of the previously described STS threaded interconnections in that fewer tapered threads of increased taper, in combination with the mechanical assistance of the straight thread run, permit a sealing joint with improved make-up length and make-up torque predictability, and increased seal integrity without the danger of destructive compressive force developing during make-up of the joint. In the joint of FIG. 7, the resistance encountered by the initial compression tapered thread sections during make-up is mechanically aided by the pushing action of the following straight thread section.

Referring now to FIG. 8, a thread interconnection between tubular members 51 and 52 is diagramatically illustrated. Here, the initial run of external threads 53 on tubular member 51 is a straight thread section, and this straight thread section is contiguous with a following run of tapered threads 54. As in FIG. 8, the number of tapered threads 54 is less than that employed in standard-tapered threaded joints, and the taper is in excess of that of the standard tapered of ¾ inch per foot. The improvement in the joint of FIG. 8 is comparable with that of FIG. 7, in that a greater metal-to-metal compressive stress is realized by the increased taper of the tapered section, while the overall compressive stress need not be destructive, since fewer tapered threads are employed. The threaded engagement of the straight threads 53 and 56 mechanically aids, during application of make-up torque to the joint, by exerting a pulling action on the tapered section. Should axial loading or pressure cause the tapered threads to yield slightly, both radial and axial reinforcement for the tapered section is provided by the straight section, with attendant advantage of resistance to swaging of male threads and swelling of female threads in the tapered section under these load conditions.

The STS, TS, and ST thread geometries described herein are formed with maintenance of uniform pitch throughout the profile, and may be cut, both internally and externally, by a thread chaser (to be described), by means of which continuity of pitch and proper mating may be attained throughout a thread profile having contiguous straight and tapered sections. This thread chaser, herein defined as an STS chaser, might best be described and understood by first considering standard threading principles and standard chasers as currently employed in cutting straight and standard-taper thread profiles.

When cutting threads, with the exception of small threads cut with taps and dies, it is almost universal practice to utilize a lead screw to advance a tool holder at a definite pitch. Chasers may cut threads in a single pass, or a single tool may make multiple passes to finish a thread. In any event, whether in an engine lathe or in an automatic threading machine, the final pass produces the full thread form. The threading tool might be fed into the work piece straight, or fed parallel to one of the flanks. In cutting threads, it can therefore be concluded that the pitch of the thread is the same as the pitch of the lead screw.

A single-point threading tool, as used for cutting standard tapered threads, is depicted in FIG. 9 which illustrates the cutting edge of a cut-away portion 57 of such a tool. This is a single-point tool, with an additional crest-radius-forming projection on the leading (long flank) side. In cutting a tapered, external thread, this chaser first forms the crest radius (1), and then subsequently, the long flank (2), root radius (3), and short flank (4).

When cutting a thread profile such as the STS thread described herein, a single-point threading tool, traversing a straight section and switching to a tapered section will, if fed perpendicularly to the work axis, hold the same lead. The locus of the chaser point will shift from a helix to a helical spiral; that is, the chaser point will remain in the same helical (corkscrew) plane at all times, generating a helix when feeding straight, and generating a helical spiral when also moving either toward or away from the work axis. Thus, a single point chaser would cut an STS thread with its root always in the same helical plane.

Point-to-point pitch measurements are longer for a tapered thread than for a straight thread. In other words, element-to-element (root-to-root, for example) distance for a straight thread is equal to the lead; but, for a tapered thread, this distance is equal to the lead times the secant of the taper angle from the work centerline. Thus a transition from straight to tapered threads results in a shift of some elements of the thread profile. For instance, the sides of a tapered thread will evolve into a long flank and a short flank, and the crests will shift, accordingly, with respect to the roots. Male threads will have longer flanks on the side of the thread root in the direction of increasing diameter. Female threads will have longer flanks in the direction of decreasing diameter.

A single point chaser will cut an STS thread with crests in one helical plane in the straight sections, and with crests in another helical plane in the tapered section. Since the crest shift that occurs on a male thread is away from the small end, and because the male thread crests engage the female thread roots, the shift that occurs is in the wrong direction, and when the tapered threads "make-up", the straight threads become looser, with the required pitch diameter clearance adding further clearance to the already loose straight threads.

Conversely, to eliminate, or actually reverse the undesirable crest shift caused by the single-point chasers when employed to cut transitions between straight and tapered thread sections of an STS thread profile, "control" may be transferred from the thread root to the thread crest by a thread chaser having two points. FIG. 10 illustrates a two-point chaser, depicting the cutting edge of a cut-away portion 58 of the chaser. This new STS thread chaser is a double point tool with short flank edges connecting the centrally located crest-forming radius with the symmetrical root-forming points. When employed to cut a tapered thread, the chaser of FIG. 10 first cuts the root radius (1), then the short flank (2), the crest radius (3), and subsequently, the long flank (4). Because the points of the STS chaser of FIG. 10 are symmetrical, both points are always at exactly the same radius, and because the points are at the same radius when cutting tapered threads (as depicted in FIG. 11 and by threads 60 on work piece 61), they travel in slightly different conical planes and the leading edge will cut a deeper groove than the path followed by the trailing point. To compensate for this radial difference, the points are moved toward each other, such that (FIG. 11) the nose radius of the leading point is placed in line with the flank that is cut by the trailing point.

When cutting straight threads, as depicted in FIG. 12 straight threads 63 on work piece 64, STS chasers form the crest radius and both flanks of a thread simultaneously. The spacing across the root-forming points being slightly closer than the thread pitch results in the root width being oversize. However, because STS chasers are two-point, or crest-forming tools, it is possible, by controlling pitch diameter, to make the transition from straight to tapered, to straight, and to regulate the spacing of male and female straight threads. By properly spacing pitch diameters, it is possible (in a make-up of an STS threaded interconnection) to load the straight threads at the same time the tapered threads become fully engaged. By more closely spacing pitch diameters, it is further possible to preload the straight threads, in which case the tapered threads would load up more heavily on the leading flanks, and the straight threads on opposite flanks.

The ideal spacing of straight-thread pitch diameters is exactly the same as the difference in pitch diameter that occurs in one-half pitch distance of the tapered thread. Stated another way, the difference in pitch diameter from a crest to the nearest root of the tapered thread is the ideal pitch diameter difference for the straight thread.

To summarize, using the crest control of the STS chaser to cut STS thread profiles, all elements of the thread crest, including the thread flanks, have identical helical plane locii. The two-point STS chaser will cut male STS threads having a root shift in the tapered section toward the smaller diameter, and will cut female STS threads having a root shift in the tapered section toward the larger diameter. As the crests of one thread engage the roots of a mating thread, the root shift of mating parts is accomodated rather than compounded. The root shift of an STS threaded joint will be of the same exact magnitude as the incremental lead variation of the joint proper. In order to have all of the loading flanks of straight and tapered sections of an STS point in contact at the same time, a straight thread pitch diameter clearance is specified. The magnitude of this clearance is a function of the thread-to-thread diametral variation in the tapered section.

The pitch diameter clearance for straight thread sections of STS threads is the same as the change in diameter in the tapered section that occurs over one-half of the pitch distance. If the pitch diameter clearance for STS threads is smaller than this specification, the tapered threads will be misaligned when the joint begins tightening. That is, the straight thread flanks that load up in tension will be in contact before the same flanks in the tapered section contact each other, and the straight section will be pulling the joint together while the tapered section attempts to push the joint apart. If the pitch diameter clearance for STS threads is greater than the above specification, however, the tapered sections will carry all of the sealing and mechanical loads, and the straight threads will act as mechanical back-up for the tapered section.

STS threaded joints can be made having clearances or interferences between the straight and tapered sections in several useful combinations: STS threaded joints can be made with linear or diametral discontinuities between straight and tapered sections; STS threaded joints can be made with tapered sections having a slightly different lead from the straight sections, by feeding the chaser at a slight work angle to the work axis; STS threaded joints can be made to "load up" axially and radially in almost any sequence or combination desired; STS threaded joints can be made to seal better and carry higher mechanical loads than conventional tapered threads, and provide these advantages when made up with much less torque; and STS threaded joints can be made with sealing and mechanical functions completely isolated from each other, and can be made with sealing and loading competence varying greatly with respect to each other.

It should be noted that the invention achieves a new and unique combination of male and female straight and tapered contiguous runs of threads finish cut with a new improved thread chaser. The thread chaser is a tool that can, while moving at a constant lead (or pitch) cut threads with loading flanks (flanks that resist pressure or tension loads) all in the same helical plane regardless of excursions along straight and tapered thread runs in any combination. As long as proper tapers and straight-thread clearances are maintained and pitch "envelopes" of mating parts are identical, joints having numerous straight and tapered sections can be manufactured that can provide seal redundancy, sealant reservoires, and test regions along with other useful applications.

Whereas, this invention is herein illustrated and described with respect to various embodiments thereof, it should be realized that various changes may be made without departing from essential contributions to the art made by the teachings hereof.

I claim:

1. A telescoping pipe coupling structure comprising: a first outer pipe section having internal threads; a second inner pipe section having external threads and being concentrically and non-engagingly receivable within said outer pipe section; at least one of said outer pipe internal threads and inner pipe external threads having a profile defined by a first plurality of threads having standard straight-thread diameter, and a second axially displaced plurality of threads having a different standard straight thread diameter, with the first and second straight threaded portions being separated by a middle plurality of threads having a linear taper so as to form a contiguous thread-run from one straight-thread diameter to the other, with the same pitch being maintained throughout; a threaded gland member having internal threads mating with said inner pipe external threads and having external threads mating with said outer pipe internal threads; and said gland member being formed with tool engaging means for engagement with a tool to turn said gland member.

2. The telescoping pipe coupling structure of claim 1, wherein the taper of said tapered threaded section is greater than the standard tapered-thread taper of three-fourths-inch per foot; and the threads in said tapered section are substantially fewer in number than are the threads in a standard tapered thread run as employed in tubular joint make-up.

3. The telescoping pipe coupling structure of claim 2, wherein the said profiles defined by said straight threaded sections and intermediate tapered threaded section defines a pitch diameter clearance between matching ones of said straight sections that is substantially the same as the change in diameter in the tapered thread section that occurs over one-half of the pitch distance in the tapered-thread section.

4. The telescoping pipe coupling structure of claim 1, wherein said tool engaging means is an extension projecting over the inner pipe section from said gland member.

5. In a telescoping pipe coupling structure of the type comprising, a first outer pipe section having internal threads; a second inner pipe section having external threads and being concentrically and non-engagingly receivable within said outer pipe section; and a threaded gland member having internal threads mating with said inner pipe external threads, and having external threads mating with said outer pipe internal threads; with said gland member being formed with an extension, projecting over the inner pipe section from the overlapping portions of said inner and outer pipe sections, for engagement with a tool to turn said gland member; a threaded interconnection between said gland member and at least one of said inner and outer pipe sections, comprising matching interconnected thread profiles defined by a first plurality of threads having standard straight-thread diameter, and a second axially displaced plurality of threads having a different standard straight thread diameter, with the first and second straight threaded portions being separated by a middle plurality of threads having a linear taper so as to form a contiguous threadrun from one straight-thread diameter to the other, with the same pitch being maintained throughout.

6. A threaded interconnection for joining first and second pipe members comprising: matching internal and external threads on the respective ones of said pipe members, the profiles of which threads are defined by a first plurality of threads having standard straight-thread diameter, and a second axially displaced plurality of threads having a different standard straight thread diameter, with the first and second straight-threaded portions being separated by a middle plurality of threads having a linear taper so as to form a contiguous thread-run from one straight-thread diameter to the other, with the same pitch being maintained throughout.

7. The threaded interconnection of claim 6, wherein the taper of said tapered-threaded section is greater than the standard tapered-thread taper of three-fourths-inch per foot; and the threads in said tapered section are substantially fewer in number than are the threads in a standard tapered thread run as employed in a tubular joint make-up.

8. The threaded interconnection of claim 7, wherein the profiles defined by said straight-threaded sections and intermediate tapered-threaded section defines a pitch diameter clearance between matching ones of said straight-threaded sections which is substantially the same as the change in diameter in the tapered-thread section that occurs over one-half of the pitch distance in the tapered-thread section.

9. In a threaded interconnection for joining first and second pipe members comprising, matching internal and external threads on the respective ones of said pipe members; a thread profile geometry for said internal and external threads defined by a first plurality of threads having standard straight-thread diameter, and a second axially displaced plurality of threads having a different standard straight-thread diameter, with the first and second straight threaded portions being separated by a middle plurality of threads having a linear taper so as to form a contiguous threadrun from one straight-thread diameter to the other, with the same pitch being maintained throughout.

* * * * *